(12) United States Patent
Urata et al.

(10) Patent No.: US 8,676,004 B1
(45) Date of Patent: Mar. 18, 2014

(54) OPTICAL CIRCUIT SWITCH OPTIMIZATION USING OPTICAL CIRCULATORS

(75) Inventors: Ryohei Urata, Sunnyvale, CA (US); Leon Poutievski, Santa Clara, CA (US); Amin Vahdat, Los Altos, CA (US); Hong Liu, Palo Alto, CA (US); Xiaoxue Zhao, Fremont, CA (US); Cedric Fung Lam, Milpitas, CA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 13/402,855

(22) Filed: Feb. 22, 2012

(51) Int. Cl.
*G02B 6/24* (2006.01)

(52) U.S. Cl.
USPC .......................................................... 385/17

(58) Field of Classification Search
None
See application file for complete search history.

(56) References Cited

U.S. PATENT DOCUMENTS

| 2003/0215178 A1* | 11/2003 | Bortolini et al. | 385/24 |
| 2010/0183311 A1* | 7/2010 | Yang et al. | 398/83 |
| 2010/0260500 A1* | 10/2010 | Ji et al. | 398/50 |

* cited by examiner

*Primary Examiner* — Sung Pak
(74) *Attorney, Agent, or Firm* — Amin, Turocy & Watson, LLP

(57) ABSTRACT

Systems and methods for optimizing port usage in an optical circuit switch are disclosed herein. A plurality of optical circulators can be coupled to the plurality of input and output ports of an optical circuit switch. An optical circulator coupled to an input port and an optical circulator coupled to an output port can form a bidirectional pair capable of communicating with any other bidirectional pair of the optical circuit switch. In this regard, the number of bidirectional ports of an optical circuit switch can be increased allowing additional bandwidth to flow through the optical circuit switch. Increasing the efficiency and capabilities of optical circuit switches within a large scale communications network can offer increased functionality and performance with little trade off.

21 Claims, 8 Drawing Sheets

US 8,676,004 B1

OPTICAL CIRCUIT SWITCH OPTIMIZATION USING OPTICAL CIRCULATORS

TECHNICAL FIELD

This application relates to communications networks, and more particularly to using optical circulators to optimize port usage in an optical circuit switch.

BACKGROUND

In many large scale communication networks, a large number of optical fiber interconnections must be managed to effectively implement the network. The number of connections to be managed can be thousands to hundreds of thousands in some cases. Such large scale networks place difficulties in planning, deployment, and upgrading communication capacity.

One aspect of large scale communications networks is that data must be passed between entities within the network. One means of distributing that data is through the use of an optical circuit switch ("OCS"). An OCS generally has an array of input ports and array of output ports. Generally, the OCS can receive data through an input port and pass the data from the input port to an output port. Thus, a network device that is connected to an OCS input port can have its data transmitted to any of the devices connected to an output port. The specific output port that receives the data can be adjusted by programming the OCS. This inherent flexibility when using an OCS provides for a more easily managed communications network that can facilitate the planning, deployment, and upgrades necessary within a large scale communication network.

When implementing a communications network using, in some aspects, an OCS, improving the efficiency and functionality of the OCS will aid in improving the capacity of the communications network. As the number of connections within the network can approach hundreds of thousands, a more efficient OCS that can serve more network devices can offer improvements in bandwidth, power consumption, scalability, etc. Thus, improving the capabilities of an OCS can offer significant advantages to a communication network provider.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to optical network connections. An optical circuit switch can be comprised of a plurality of input ports and a plurality of output ports. A plurality of input optical circulators can be connected to the plurality of input ports. A plurality of output optical circulators can be connected to the plurality of output ports. A pairing component can be configured to generate a plurality of bidirectional pairs wherein a bidirectional pair consists of one input optical circulator and one output optical circulator.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1A:
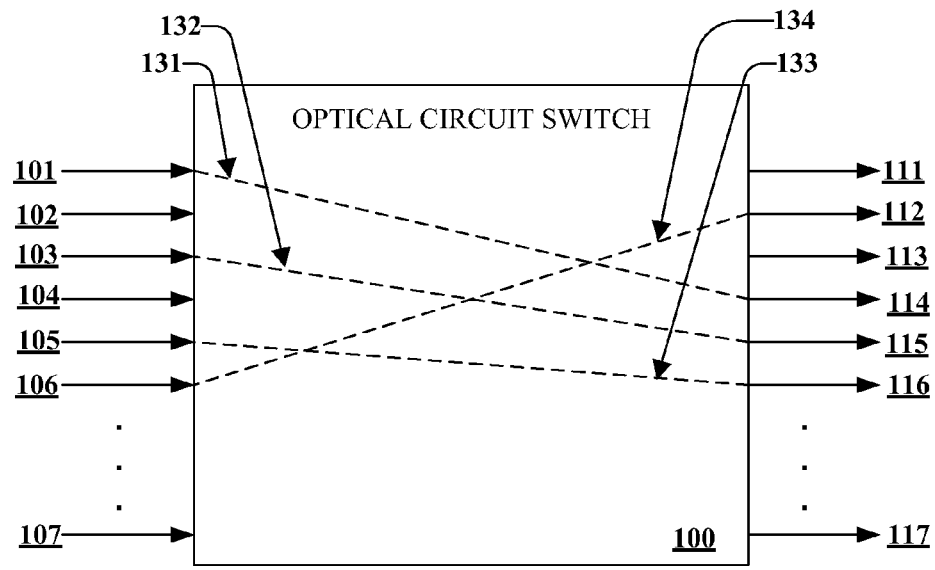
FIG. 1A illustrates an example optical circuit switch.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Large scale communication networks that use switches as a part of its infrastructure are common. Generally, a switch has a set of input ports and a set of output ports, wherein the switch can map an input port to an output port allowing a signal to propagate from an input port to an output port. One type of switch is an optical circuit switch ("OCS") which can be implemented through various mechanisms: 1) mechanical switching mechanisms, 2) electro-optical mechanisms or 3) thermo-optical mechanisms. The switch can direct light beams between different ports.

One example method of directing light beams within an OCS is using micro-electro-mechanical systems (MEMS) based technology with arrays of silicon minors which are tilted by applying a control signal (voltage signal) to deflect optical beams in free space to different ports. In another example, piezoelectric actuator technology can be used to steer optical beams in free space between different ports.

In directing light beams within an OCS to create an optical path for a signal, a passive optical path can be established between an input port and an output port. By the law of energy conservation, this passive optical path must be bidirectional or reciprocal as light can pass in both direction along the path in a symmetric, similar manner. More specifically, changes in amplitude and phase of the light signal are the same going from the input port to the output port or from the output port to the input port. Because of this bidirectional nature, optical paths can be established that not only transmit data from an input port to an output port but that can also transmit data from an output port to an input port.

It can be appreciated that with an optical path within an OCS being used in a bidirectional manner, any reflections in the optical path can create a noise signal in addition to the desired signal. The reflection can be reduced by optimizing every connection and signal path for low return loss, e.g., low reflection. One method for reducing return loss both within an OCS and its connections to other hardware is to use low return loss connector technologies such as an ultra physical contact connector, an angled physical contact connector, or by eliminating connectors and using fusion splicing. In addition, within the OCS, optical paths can be optimized for low return loss between fiber optic components and free space components, using, for example, applicable dielectric coating technologies and/or index matching materials.

In many applications, it is desirable that the number of switch ports served by an OCS be maximized in order to provide the greatest possible bandwidth and interconnect counts. Systems and methods are disclosed herein that utilize the bidirectional nature of the optical paths within an OCS to provide for optimizing the bandwidth and interconnect counts of an OCS.

Referring now to FIG. 1A, there is illustrated an example optical circuit switch 100. A set of N input ports (N is an integer) are denoted by 101, 102, 103, 104, 105, 106, and 107. A set of M output ports (M is an integer) are denoted by 111, 112, 113, 114, 115, 116, and 117. It can be appreciated that N can be greater than M, M can be greater than N, or N and M can be equal. Optical paths 131, 132, 133, and 134 can connect an input port to an output port. It can be appreciated that optical paths 131, 132, 133, and 134 can be MEMS based, use piezoelectric actuator technology, or other methods to form an optical path between an input port and output port.

OCS 100 can be programmable, using software or hardware means, to adjust optical paths 131, 132, 133 and 134 to form paths with other input ports and output ports. For example, as depicted, optical path 131 connects input port 101 with output port 114. OCS 100 can be reprogrammed to remove optical path 131 and create a new optical path that can connect input port 101 with any of the M output ports.

Figure 1B:
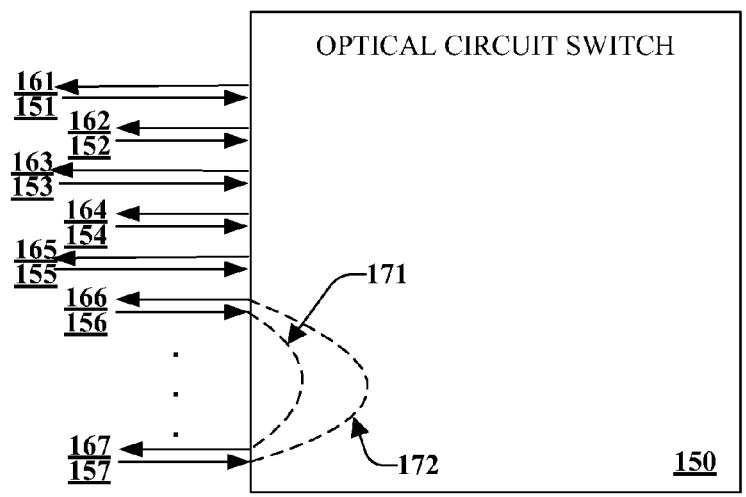
FIG. 1B illustrates an example optical circuit switch with input/output ports paired to form a bidirectional port.

Referring now to FIG. 1B, there is illustrated an example optical circuit switch 150 with input/output ports paired to form a bidirectional port. A set of P input ports (P is an integer) are denoted by 151, 152, 153, 154, 155, 156, and 157. A set of R output ports (R is an integer) are denoted by 161, 162, 163, 164, 165, 166, and 167. Instead of the input ports residing on the left side of the OCS and the output ports residing on the right side of the OCS as depicted in FIG. 1A, the OCS in FIG. 1B has been folded horizontally so that input ports and output ports reside on the left edge.

Input port 157 and output port 167 can be paired to create a bidirectional port. For example, a network entity connected to the bidirectional port could send data through input port 157 and receive data from output port 167. A bidirectional port comprising input port 157 and output port 167 can connect to other ports within OCS 150, for example, as depicted; they connect to input port 156 and output port 166 through optical paths 171 and 172 respectively. A bidirectional port can be connected through a duplex (two input/output) optical fiber connector.

OCS 150 contains P input ports and R output ports. Generally, an OCS contains identical numbers of input ports and output ports, that is P equals R, however that need not always be the case. In an example, where P equals R, OCS 150 would contain P bidirectional ports, as a bidirectional port includes both an input port and an output port.

It can be appreciated that optical paths 171 and 172 can be MEMS based, use piezoelectric actuator technology, or other methods to form an optical path between an input port and output port.

Similar to OCS 100, OCS 150 can be programmable, using software or hardware means, to adjust optical paths 171 and 172 to form paths with other input ports and output ports. For example, bidirectional port comprising input port 157 and output port 167 can connect to input port 151 and output port 161 respectively. Thus, OCS 150 can be reprogrammed to remove optical paths 171 and 172 or to create new optical paths not depicted in FIG. 1B.

Figure 2A:
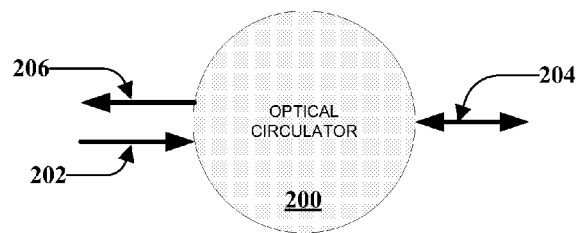
FIG. 2A illustrates an example optical circulator.

Turning now to FIG. 2A, there is illustrated an example optical circulator 200. Optical circulator 200 has three ports, a first port 202, a second port 204 and third port 206. An input into the first port 202 is directed to the second port 204, an input into the second port 204 is directed to the third port 206. Thus, an optical circulator can allow bi-directional transmission over a single fiber or a single optical path by propagating a signal received at the first port 202 through the second port 204, e.g., sending a signal, and propagating a signal received by the second port 204 to the third port 206, e.g., receiving a signal.

Figure 2B:
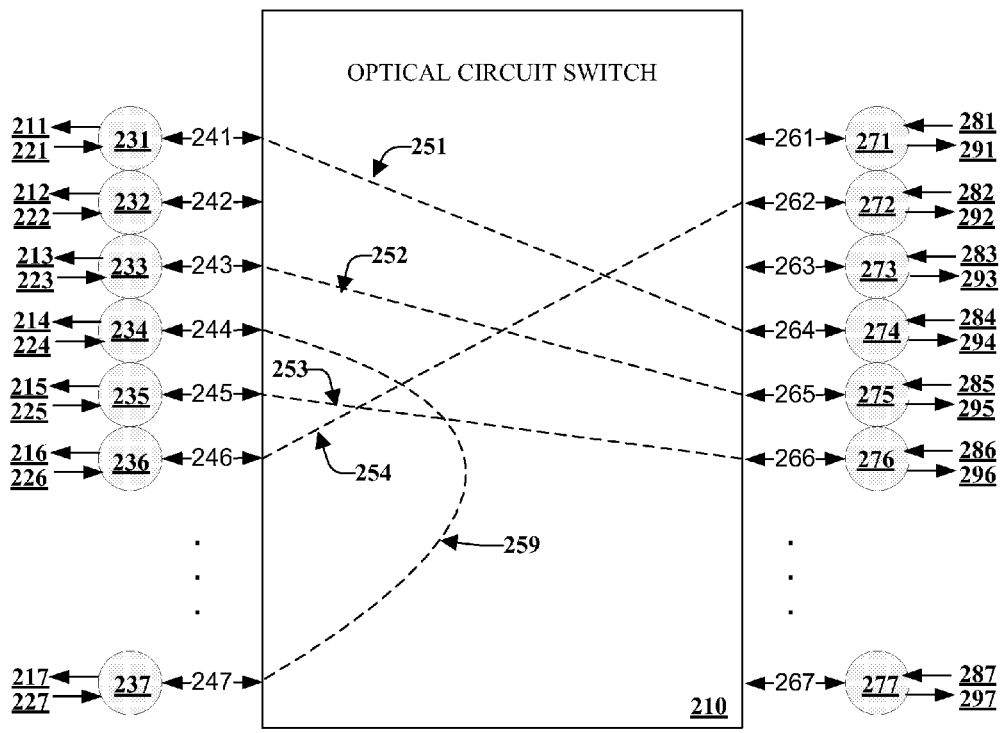
FIG. 2B illustrates an example optical circuit switch with input/output ports coupled to individual optical circulators in accordance with an implementation of this disclosure.

Turning now to FIG. 2B there is illustrated an example optical circuit switch 210 with input/output ports coupled to individual optical circulators in accordance with an implementation of this disclosure. OCS 210 can have X input ports (X is an integer) denoted by connections 241, 242, 243, 244, 245, 246 and 247. OCS 210 can have Y output ports (Y is an integer) denoted by connections 261, 262, 263, 264, 265, 266, and 267. Each of the X input ports can be connected to X separate optical circulators 231, 232, 233, 234, 235, 236 and 237. In one implementation, the X input ports can be connected to the X optical circulators at the second port of each optical circulator. In one implementation, connections 241, 242, 243, 244, 245, 246 and 247 that couple the X optical circulators to the X input ports can be made by using at least one of an ultra physical contact connector, an angled physical contact connector or fiber fusion splicing.

Each of the Y output ports can be connected to Y separate optical circulators 271, 272, 273, 274, 275, 276 and 277. In one implementation, the Y output ports can be connected to the Y optical circulators at the second port of each optical circulator. In one implementation, connections 261, 262, 263, 264, 265, 266 and 267 that couple the Y optical circulators to the Y output ports can be made by using at least one of an ultra physical contact connector, an angled physical contact connector or fiber fusion splicing.

The X optical circulators create X bidirectional ports allowing, for example, a network device connected to optical circulator 231 through ports 211 and 221 to bidirectionally communicate over optical path 251 with a network device connected to optical circulator 274 through ports 284 and 294. The Y optical circulators create Y bidirectional ports allowing, for example, a network device connected to optical circulator 272 through ports 282 and 292 to bidirectional communicate over optical path 254 with a network device connected to optical circulator 236 through ports 216 and 226.

Through the use of an OCS and optical circulators connected to each input and output port, the number of bidirectional ports can double from OCS 150 as each individual input port (241, 242, 243, 244, 245, 246, and 247) and each individual output (261, 262, 263, 264, 265, 266 and 267) is a single bidirectional port.

One aspect of an OCS that may limit connectivity, however, is the nature of input ports versus output ports inherent in some OCS. For example, optical path 259 connecting input port 244 and input port 247 may not be a possible using some OCS technology. An OCS may be designed in some cases to only allow signal propagation between an input port and an output port and not between two input ports and two output ports respectively. Thus, even though the number of bidirectional ports may be doubled in some implementations, those ports have limited connectivity and can only connect to either traditional input ports or output ports of the OCS.

Figure 3:
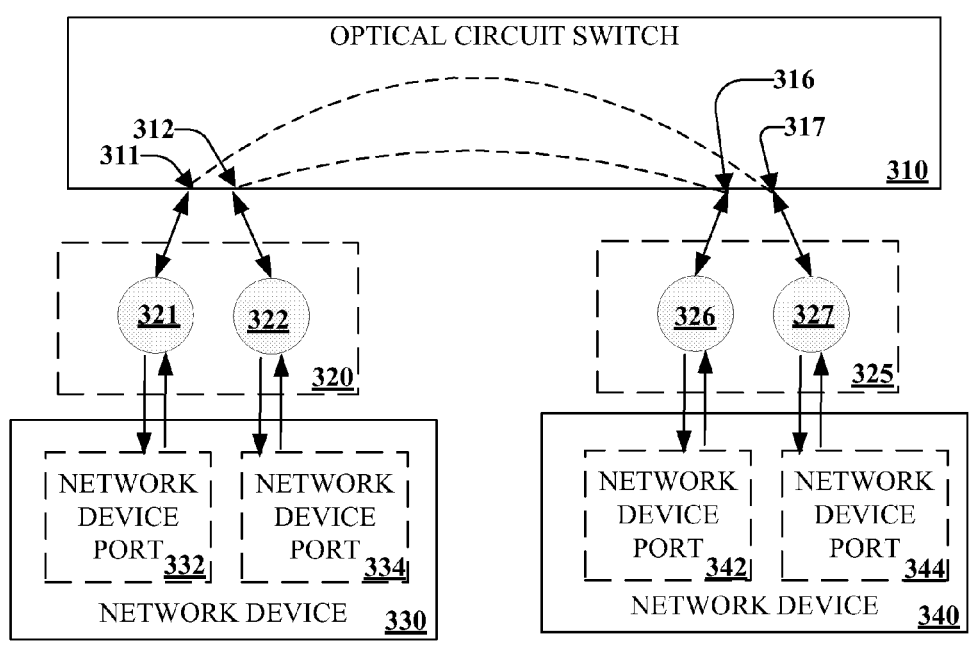
FIG. 3 illustrates an example optical circuit switch with input/output ports coupled to individual optical circulators to form a unit in accordance with an implementation of this disclosure.

Turning now to FIG. 3, there is illustrated an example optical circuit switch with input/output ports coupled to individual optical circulators to form a bidirectional unit in accordance with an implementation of this disclosure. By pairing input and output ports together as one bidirectional unit, any bidirectional unit can be connected to any other bidirectional unit. Each network device is connected to both an input port and an output port of the OCS through a bidirectional unit. Therefore, any network device can be connected to any other network device. Thus, in case of a limited connectivity OCS, using bidirectional units can resolve the issue of input ports of a limited connectivity OCS not being able to propagate a signal to other input ports of the limited connectivity OCS. Specifically, this is done by using an output port of an initial bidirectional unit to propagate a signal to an input port of a different bidirectional unit and then using an output port of the different bidirectional unit to propagate a signal to an input port of the initial bidirectional unit. As stated above, the number of bidirectional ports in an OCS can be doubled by connecting each port of the OCS to an optical circulator and connecting each network device with two different optical circulators, one which is connected to an input port of the OCS and one that is connected to an output port of the OCS. In pairing optical circulators associated with an input port and an output port of the OCS together to form a bidirectional unit, the number of bidirectional units is the same as the original number of bidirectional ports in the OCS not connected to optical circulators. However, the bandwidth provided by a bidirectional unit is greater than the bandwidth of a single bidirectional port of an OCS not connected to optical circulators, because a bidirectional unit can propagate signals using two bidirectional ports, e.g., optical circulators connected to an input port and an output port of the OCS.

Each input and output port of OCS 310 is connected to an optical circulator, as previously depicted in FIG. 2B. A bidirectional unit 320 can be formed by pairing an input port 311 optical circulator 321 and an output port 312 optical circulator 322. It can be appreciated that input port 311 can be arbitrarily chosen from any available OCS 310 input port. It can be appreciated that output port 312 can be arbitrarily chosen from any available OCS 310 output port. A second bidirectional unit 325 can be formed by pairing an input port 316 optical circulator 326 and an output port 317 optical circulator 327.

By pairing input and output ports together, any bidirectional unit can be connected to any other bidirectional unit. For example, input port 310 may be limited in that it cannot also connect to input port 316. However, because bidirectional unit 320 communicates over input port 311 and output port 312, an optical path can be established to any other unit, as bidirectional unit 320 can establish paths to both input ports and output ports using output port 312 and input port 310 respectively.

In an example, network device 330 can communicate via network device port 332 and network device port 334. Network device port 332 can be connected to optical circulator 321 and network device port 334 can be connected to optical circulator 322 of bidirectional unit 320. Similarly, network device 340 can communicate via network device port 342 and network device port 344. Network device port 342 can be connected to optical circulator 326 and network device port 344 can be connected to optical circulator 327 of bidirectional unit 325. Because any bidirectional unit can communicate with any other bidirectional unit, network device 330 can communicate with network device 340 using associated bidirectional units 320 and 325.

Figure 4:
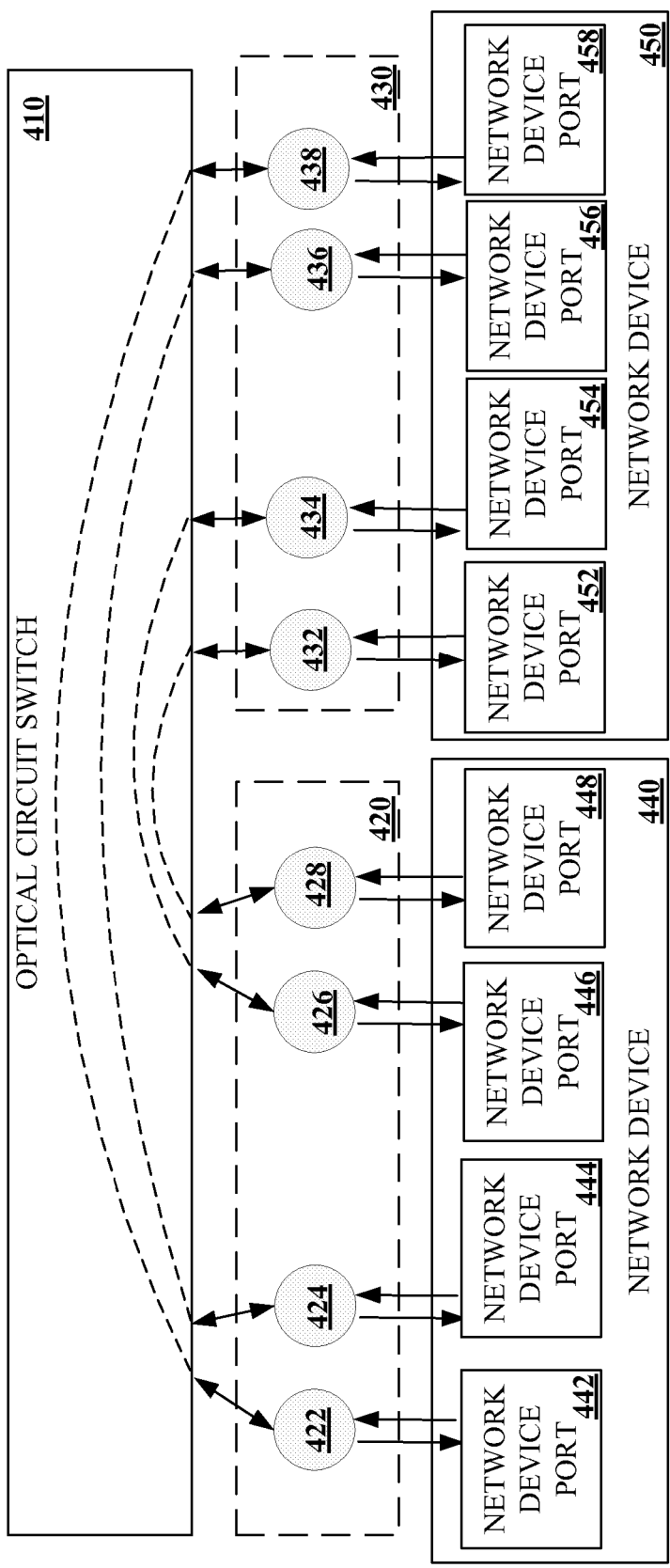
FIG. 4 illustrates an example optical circuit switch with input/output ports coupled to individual optical circulators to form a scaled unit in accordance with an implementation of this disclosure.

Turning now to FIG. 4, there is illustrated an example optical circuit switch with input/output ports coupled to individual optical circulators to form a scaled unit in accordance with an implementation of this disclosure.

Bidirectional unit 420 contains four optical circulators 422, 424, 426, and 428. Optical circulators 422 and 424 are associated with an input port and output port of OCS 410. Similarly, optical circulators 426 and 428 are coupled to an input port and output port of OCS 410.

Bidirectional unit 430 contains four optical circulators 432, 434, 436, and 438. Optical circulators 432 and 434 are associated with an input port and output port of OCS 410. Similarly, optical circulators 436 and 438 are coupled to an input port and output port of OCS 410.

Bidirectional unit 420 can communicate with any other bidirectional unit of optical circuit switch 410, such as bidirectional unit 430. Thus, network device 440 can communicate with network device 450 using bidirectional units 420 and 430 respectively. It can be appreciated that by scaling the size of the bidirectional units larger (e.g., four optical circulators associated with two input output pairs versus the 2 optical circulators associated with the single input output pair as depicted in FIG. 3) bandwidth between two interconnected bidirectional units can be increased. Increased bandwidth does not affect the ability of any bidirectional unit to have interconnectivity with other bidirectional units associated with OCS 410.

Figure 5:
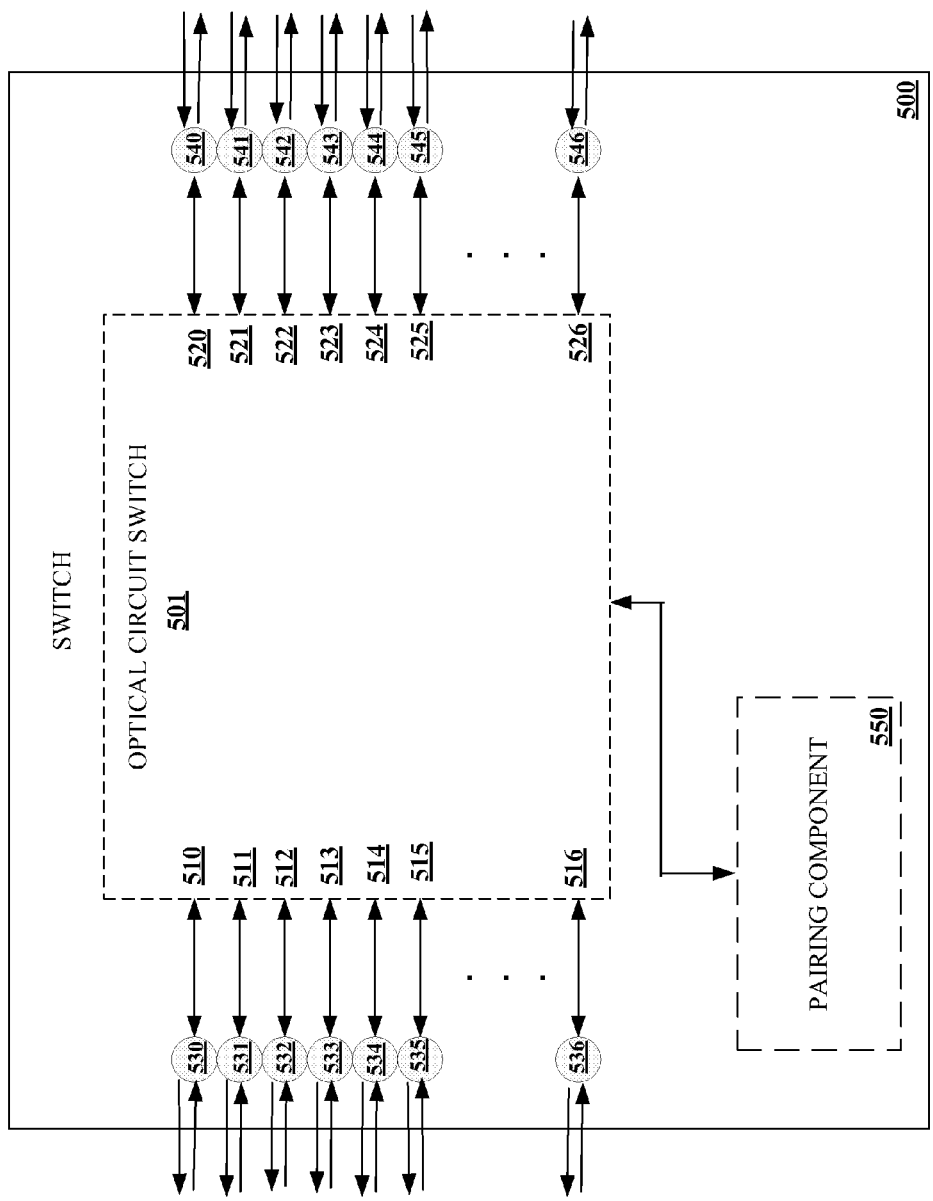
FIG. 5 illustrates a high-level functional block diagram of an example switch using optical circulators to optimize OCS port usage in accordance with an implementation of this disclosure.

Turning now to FIG. 5 there is illustrated a high-level functional block diagram of an example switch 500 using optical circulators to optimize OCS port usage in accordance with an implementation of this disclosure. An OCS 501 can comprise a plurality of input ports (e.g., 510, 511, 512, 513, 514, 515 and 516) and a plurality of output ports (e.g., 520, 521, 522, 523, 524, 525, and 526). The plurality of input ports can be connected to a plurality of input optical circulators (e.g., 530, 531, 532, 533, 534, 545 and 536). The plurality of output ports can be connected to a plurality of output optical circulators (e.g., 540, 541, 542, 543, 544, 545 and 546).

A pairing component 550 can be configured to generate a plurality of bidirectional pairs wherein a bidirectional pair can consist of one input optical circulator and one output optical circulator. In one implementation, pairing component 550 can dynamically adjust which input port and output port are associated together as a bidirectional pair based on connectivity needs. For example, if a network device is connected to input optical circulators 530 and 531 as well as output optical circulators 540 and 541, using four network device ports, four possible bidirectional pairs are possible using those ports (e.g., input optical circulator 530 and output optical circulator 540, input optical circulator 531 and output optical circulator 540, input optical circulator 530 and output optical circulator 541, and input optical circulator 531 and output optical circulator 541). Paring component 510 can dynamically control which input optical circulator and output optical circulator are associated with each other to form a bidirectional pair. It can be appreciated that the dynamic adjustment can occur automatically, or in response to a remote or local user request. It can be further appreciated that any bidirectional pair can connect with any other of the plurality of bidirectional pairs.

In one implementation, pairing component 550 can dynamically control OCS 501. For example, pairing component 550 can turn ports on and off, connect two ports, switch connection of two ports, etc. It can be appreciated that pairing component 550 in dynamically adjusting which input port and output port are associated together as a bidirectional pair, can also dynamically adjust OCS 510 to provide for appropriate signal propagation between bidirectional pairs. It can be further appreciated that the dynamic adjustment to OCS 510 can also occur automatically, or in response to a remote or local user request.

In one implementation, the plurality of input optical circulators (e.g., 530, 531, 532, 533, 534, 545 and 536) can be coupled to the plurality of input ports (e.g., 510, 511, 512, 513, 514, 515 and 516) using at least one of an ultra physical contact connector, an angled physical contact connector or fiber fusion splicing. It can be appreciated that other means to reduce or lower return loss can also be used.

In one implementation, the plurality of output optical circulators (e.g., 540, 541, 542, 543, 544, 545 and 546) can be coupled to the plurality of output ports (e.g., 520, 521, 522, 523, 524, 525, and 526) using at least one of an ultra physical contact connector, an angled physical contact connector or fiber fusion splicing. It can be appreciated that other means to reduce or lower return loss can also be used. It can be further appreciated that individual ports and circulators need not all be connected using the same connection method. Input ports and output ports need not be connected to input optical circulators and output optical circulators in the same method.

In one implementation, the interface between fiber optic components and free space components within OCS 501 can be optimized for low return loss.

Figure 6:
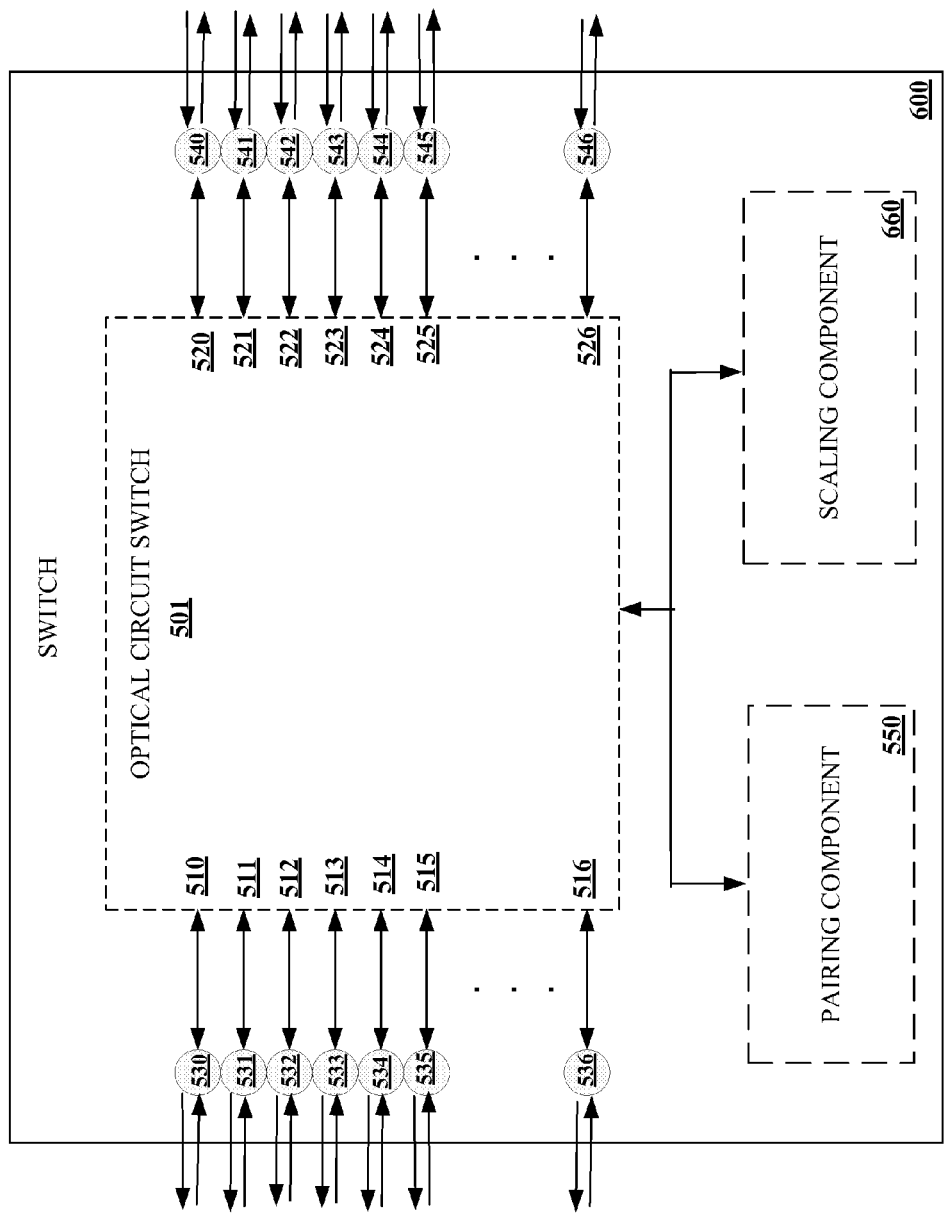
FIG. 6 illustrates a high-level functional block diagram of an example switch using optical circulators to optimize OCS port usage including a scaling component in accordance with an implementation of this disclosure.

Turning now to FIG. 6, there is illustrated a high-level functional block diagram of an example switch 600 using optical circulators to optimize OCS port usage including a scaling component 660 configured to generate a plurality of bidirectional units comprising at least two bidirectional pairs wherein any one bidirectional unit has connectivity with the plurality of bidirectional units. In one implementation, the plurality of bidirectional units can contain the same amount of bidirectional pairs.

In one implementation, scaling component 660 can dynamically adjust which input ports and output ports are associated together as a bidirectional unit based on connectivity needs. It can be appreciated that the dynamic adjustment can occur automatically, or in response to a remote or local user request.

Figure 7:
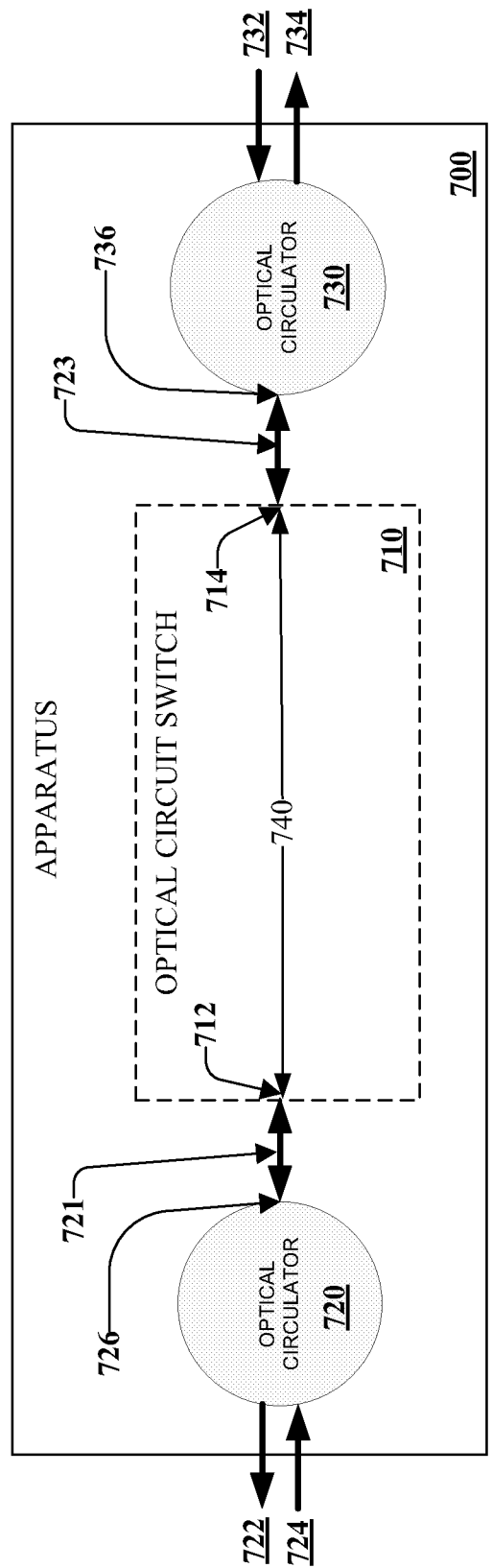
FIG. 7 illustrates a high-level functional block diagram of an example apparatus in accordance with an implementation of this disclosure.

Turning now to FIG. 7 there is illustrated a high-level functional block diagram of an example apparatus in accordance with an implementation of this disclosure. The following describes an OCS and optical circulators connected so that the OCS can both receive and transmit signals between a single port pairing over a bidirectional path. An OCS 710 including a first port 712 and a second port 714, wherein the first port 712 and second port 714 are coupled to each other by a bidirectional path 740.

The first port 712 of the OCS 710 can be coupled to a second port 726 of a first optical circulator 720 by way of a bidirectional path 721, wherein the first optical circulator 720 includes a first port 724 that is configured to receive an input optical signal and a third port 722 that is configured to output an optical signal.

The second port 714 of the OCS 710 can be coupled to a second port 736 of a second optical circulator 730 by way of a bidirectional path 723, wherein the second optical circulator 730 includes a first port 732 that is configured to receive an input optical signal and a third port 734 that is configured to output an optical signal.

The first port 724 of the first optical circulator 720, the first port 712 of the OCS 710, the second port 714 of the OCS 710 and the third port 734 of the second optical circulator 730 are configured to form a first path.

The first port 732 of the second optical circulator 730, the second port 714 of the OCS 710, the first port 712 of the OCS 710 and the third port 722 of the first optical circulator 720 are configured to form a second path.

It can be appreciated that the first path and the second path both use bidirectional path 740. It can be further appreciated that the first path and the second path can propagate a signal simultaneously.

In one implementation, the first path and the second path can form a bidirectional pair configured to transmit optical signals in opposite directions respectively.

In one implementation, the first port 712 of the OCS 710 can be coupled by a bidirectional path 721 to the second port 726 of the first optical circulator 720 using at least one of an ultra physical contact connector, an angled physical contact connector or fiber fusion splicing.

In one implementation, the second port 714 of the OCS 710 can be coupled 723 to the second port 736 of the second optical circulator 730 using at least one of an ultra physical contact connector, an angled physical contact connector or fiber fusion splicing.

In one implementation, the OCS 710 can be optimized for low return loss.

It can be appreciated that OCS 710 can contain additional ports and paths not depicted.

Figure 8:
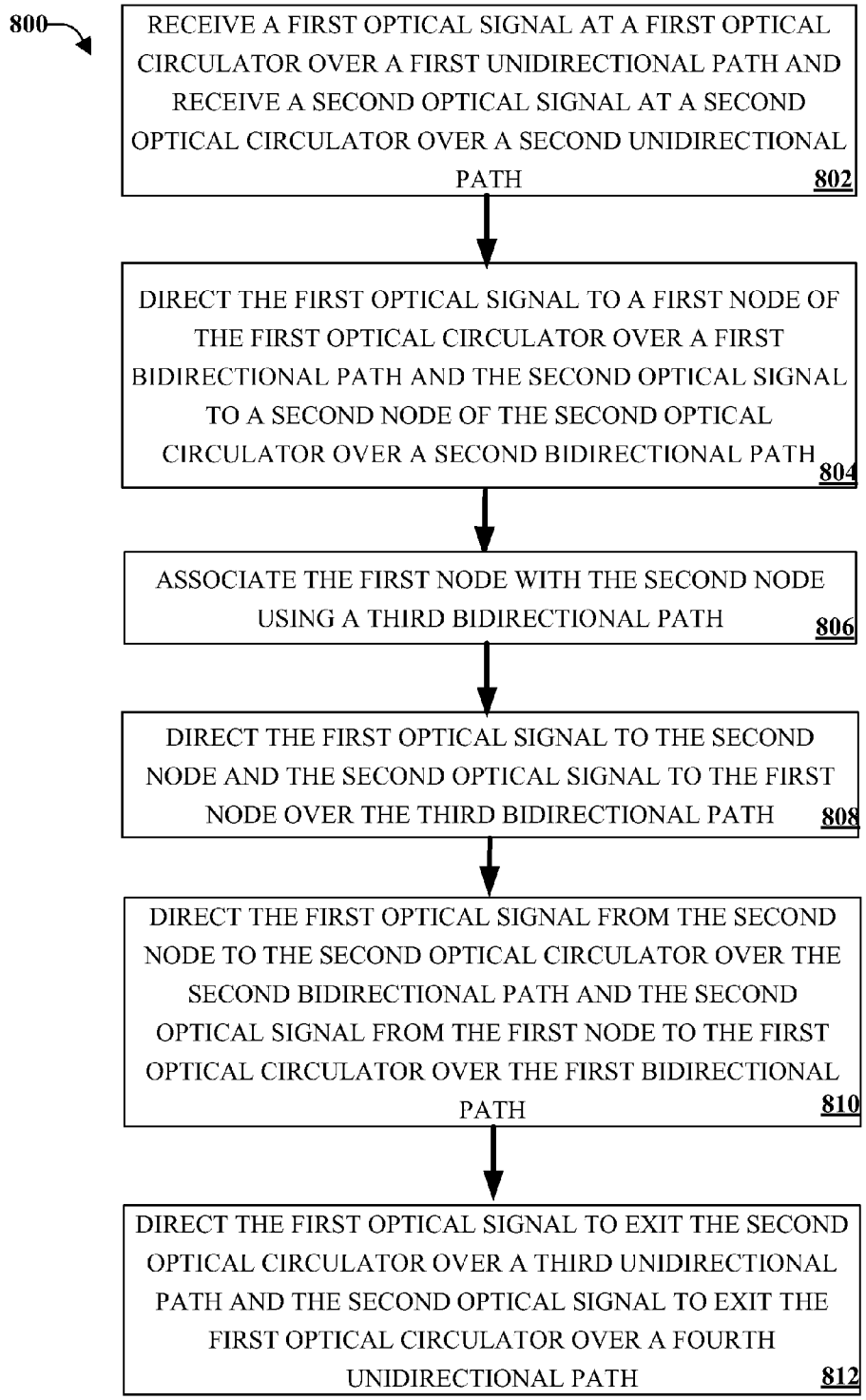
FIG. 8 illustrates an example method for optimizing an optical circuit switch.

FIG. 8 illustrates methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

FIG. 8 illustrates an example method for optimizing an optical circuit switch. The method is described as occurring in the apparatus shown in FIG. 7, although is not limited to this arrangement. At 802, a first optical circulator (e.g., 720) receives a first optical signal over a first unidirectional path (e.g., at port 724) and a second optical circulator (e.g., 730) receives a second optical signal over a second unidirectional path (e.g., at port 732). At 804, the first optical signal is directed to a first node, (e.g., port 712), of an OCS (e.g., 710) over a first bidirectional path (e.g., 721) and the second optical signal to a second node (e.g., 714) of the OCS over a second bidirectional path (e.g., 723). At 806, the first node is associated with the second node using a third bidirectional path (e.g., 740) of the OCS. At 808, the first optical signal is directed to the second node and the second optical signal to the first node over the third bidirectional path. At 810, the first optical signal is directed from the second node to the second optical circulator over the second bidirectional path while the second optical signal is directed to the first optical circulator over the first bidirectional path. At 812, the first optical signal is directed to exit (e.g., at port 734) the second optical circulator over a third unidirectional path and the second optical signal to exit the first optical circulator (e.g., at port 722) over a fourth unidirectional path. Thus, using two optical circulators and an OCS, a single pair of ports of the OCS can direct signals to and from both of the ports of the pair and provide for bidirectional signal propagation.

In one implementation, directing the first optical signal to the second node and the second optical signal to the first node over the third bidirectional path can occur simultaneously.

In one implementation the third bidirectional path can be optimized for low return loss.

In one implementation, the first bidirectional path and the second bidirectional path can be associated as a bidirectional pair.

In one implementation, the first node and the second node are coupling points wherein the coupling points can be comprised of at least one of an ultra physical contact connector, an angled physical contact connector or fiber fusion splicing.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. An apparatus comprising:
an optical circuit switch (OCS) including a first port, a second port, a third port, and a fourth port, wherein the first and second ports of the OCS are coupled to each other by a first switch bidirectional path and the third and fourth port of the OCS are coupled to each other by a second switch bidirectional path;
a first optical circulator, wherein the first port of the OCS is coupled to a second port of the first optical circulator by way of a first bidirectional path, the first optical circulator includes a first port that is configured to receive a first input optical signal and a third port that is coupled to a first node via a second unidirectional path from the third port of the first optical circulator to the first node;
a second optical circulator, wherein the second port of the OCS is coupled to a second port of the second optical circulator by way of a second bidirectional path, the second optical circulator includes a first port that is configured to receive a second input optical signal and a third port that is coupled to a second node via a second unidirectional path from the third port of the second optical circulator to the second node;
a third optical circulator, wherein the third port of the OCS is coupled to a second port of the third optical circulator by way of a third bidirectional path, the third optical circulator includes a first port that is coupled to the first node via a third unidirectional path from the first node to the first port of the third optical circulator and a third port that is coupled to the first node via a fourth unidirectional path from the third port of the third optical circulator to the first node; and
a fourth optical circulator, wherein the fourth port of the OCS is coupled to a second port of the fourth optical circulator by way of a fourth bidirectional path, the fourth optical circulator includes a first port that is coupled to the second node via a fifth unidirectional path from the second node to the first port of the fourth optical circulator and a third port that is coupled to the second node via a sixth unidirectional path from the third port of the fourth optical circulator to the second node; wherein,
the first port of the first optical circulator, the first port of the OCS, the second port of the OCS and the third port of the second optical circulator are configured to form a first path capable of propagating the first optical signal to the second node;
the first port of the second optical circulator, the second port of the OCS, the first port of the OCS and the third port of the first optical circulator are configured to form a second path capable of propagating the second optical signal to the first node;
the first port of the third optical circulator, the third port of the OCS, the fourth port of the OCS and the third port of the fourth optical circulator are configured to form a third path capable of propagating the second optical signal from the first node to the second node; and
the first port of the fourth optical circulator, the fourth port of the OCS, the third port of the OCS and the third port of the third optical circulator are configured to form a fourth path capable of propagating the first optical signal from the second node to the first node.

2. The apparatus of claim 1, wherein the first path and the second path form a bidirectional pair configured to transmit optical signals in opposite directions respectively.

3. The apparatus of claim 1, wherein the first port of the OCS is coupled to the second port of the first optical circulator using at least one of an ultra physical contact connector, an angled physical contact connector or fiber fusion splicing.

4. The apparatus of claim 1, wherein the second port of the OCS is coupled to the second port of the second optical circulator using at least one of an ultra physical contact connector, an angled physical contact connector or fiber fusion splicing.

5. The apparatus of claim 1, wherein the OCS is optimized for low return loss.

6. The apparatus of claim 1, wherein the first path and the second path can carry optical signals simultaneously.

7. A method comprising:
receiving a first optical signal over a first unidirectional path and a second optical signal over a second unidirectional path;
directing the first optical signal to a first node over a first bidirectional path and the second optical signal to a second node over a second bidirectional path;
associating the first node with the second node by using a third bidirectional path;
directing the first optical signal to the second node and the second optical signal to the first node over the third bidirectional path; and
directing the first optical signal to exit over a third unidirectional path and the second optical signal to exit over a fourth unidirectional path.

8. The method of claim 7, wherein the directing the first optical signal to the second node and the second optical signal to the first node over the third bidirectional path occurs simultaneously.

9. The method of claim 7, wherein the third bidirectional path is optimized for low return loss.

10. The method of claim 7, further comprising:
associating the first bidirectional path and the second bidirectional path as a bidirectional pair.

11. The method of claim 7, wherein the first node and the second node are coupling points wherein the coupling points are comprised of at least one of an ultra physical contact connector, an angled physical contact connector or fiber fusion splicing.

12. A switch comprising:
an optical circuit switch comprising a plurality of input ports and a plurality of output ports;
a plurality of input optical circulators connected to the plurality of input ports;
a plurality of output optical circulators connected to the plurality of output ports; and
a pairing component configured to associate a plurality of bidirectional pairs, wherein a bidirectional pair consists of one input optical circulator and one output optical circulator, and any one bidirectional pair has connectivity with the plurality of bidirectional pairs.

13. The switch of claim 12, wherein the pairing component can adjust one or more of the bidirectional pairs based upon a user request.

14. The switch of claim 12, further comprising:
a scaling component configured to generate a plurality of bidirectional units comprising at least two bidirectional pairs, wherein any one bidirectional unit has connectivity with the plurality of bidirectional units.

15. The switch of claim 14, wherein each of the plurality of bidirectional units contains the same amount of bidirectional pairs.

16. The switch of claim 12, wherein connecting the plurality of input optical circulators with the plurality of input ports uses at least one of an ultra physical contact connector, an angled physical contact connector or fiber fusion splicing.

17. The switch of claim 12, wherein connecting the plurality of output optical circulators with the plurality of output ports uses at least one of an ultra physical contact connector, an angled physical contact connector or fiber fusion splicing.

18. The switch of claim 12, wherein an interface between fiber optic components and free space components in the optical circuit switch is optimized for low return loss.

19. The switch of claim 12, wherein the plurality of input optical circulators is capable of bidirectional communication over the plurality of input ports.

20. The switch of claim 12, wherein the plurality of output optical circulators is capable of bidirectional communication over the plurality of output ports.

21. The switch of claim 12, wherein the pairing component is further configured to dynamically control signal propagation within the optical circuit switch.

* * * * *